United States Patent Office

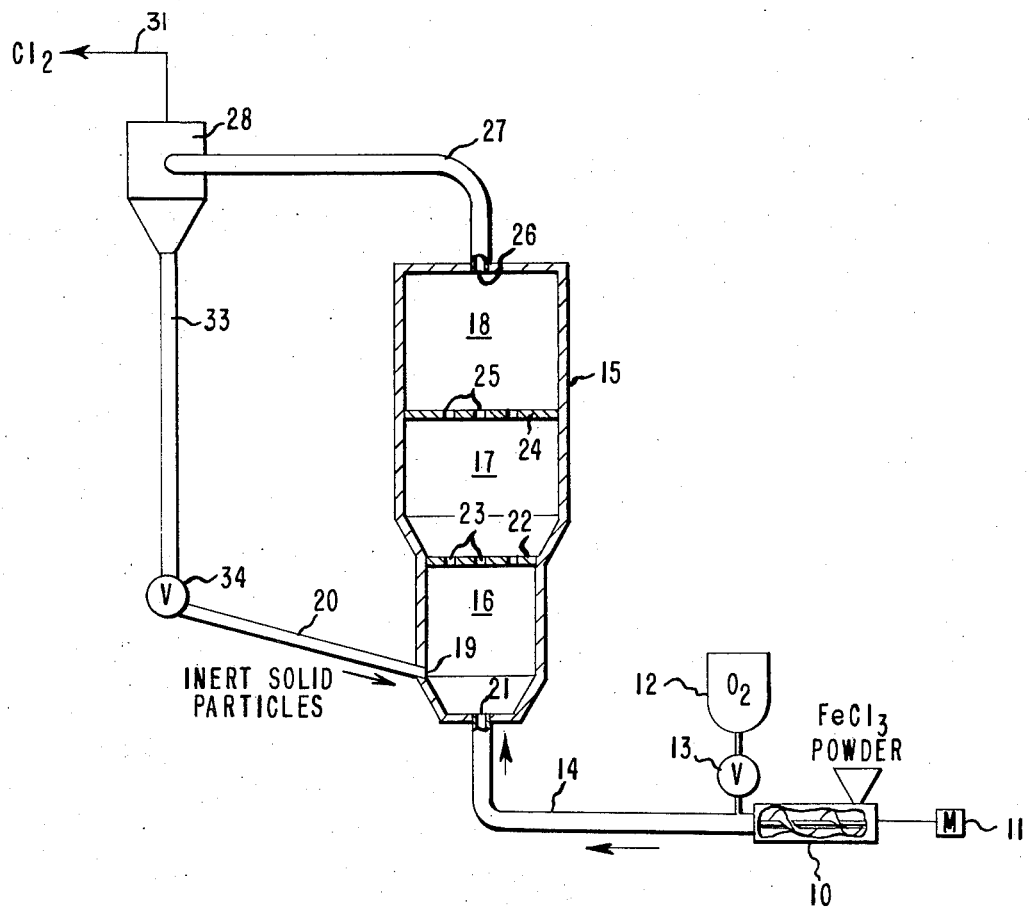

3,793,444
Patented Feb. 19, 1974

3,793,444
MULTISTAGE IRON CHLORIDE OXIDATION
PROCESS
James William Reeves, Wilmington, Del., and David
Francis Wells, Avondale, Pa., assignors to E. I. du Pont
de Nemours and Company, Wilmington, Del.
Filed Feb. 9, 1972, Ser. No. 224,743
Int. Cl. C01g 49/06
U.S. Cl. 423—633                               10 Claims

ABSTRACT OF THE DISCLOSURE

A process is provided for the oxidation of an iron chloride wherein vapors of the chloride and an oxygen-containing gas are caused to pass upwardly through a vertical reaction area provided with a series of communicating reaction zones, each separated from the next adjacent one by a foraminous member. There is maintained upward with the flow of gases a flow of inert solid particles through and out of the reaction area in an amount at least equal to the gas flow rate on a weight basis. High conversions of the iron chloride can be attained in this manner without the unwanted build-up of iron oxide scale on the reactor walls or associated parts.

BACKGROUND

Iron chlorides are commonly obtained as by-products in various manufacturing operations involving a chlorination step, for example in the manufacture of titanium dioxide by the chloride process. For various reasons considerable attention has been devoted to the development of processes for the conversion of the by-product iron chloride to its corresponding oxide. In particular a suitable oxidation process would enable a recovery to be made of the chlorine content of the iron chloride, and chlorine is a relatively costly industrial chemical.

Little success has been achieved, however, in developing an iron chloride oxidation process that could be economically performed on a commercial scale. For example, a number of techniques have been proposed that involve a vapor-phase reaction, as this offers the theoretical possibility of high production rates with an exothermic reaction of this sort. In practice, however, such techniques suffer from the difficulty that in generating the solid iron oxide reaction product from gaseous reactants there is a severe tendency for oxide scale to build up on the reactor walls and on associated equipment. Sawyer U.S. Pat. 2,642,339 suggests that the wall scale problem can be overcome by the use of a fluidized bed reactor containing a fixed charge of finely divided particles. But it has been demonstrated that scale nonetheless occurs above the bed level, indeed to such an extent that the outlet may become completely plugged. Additionally, it can be noted that when operating a fluidized bed in the manner suggested by Sawyer, i.e. a dense-phase bed having a well-defined freeboard, it is not practical for the bed depth to exceed a certain maximum level without encountering excessive channeling and bubbling of gas through the bed. That maximum size is, moreover, well below the minimum size that is considered to be commercially attractive.

SUMMARY

In accordance with the present invention, applicants have developed a technique for conducting the vapor phase oxidation of iron chloride in a manner that effectively overcomes the deficiencies noted above in respect of prior art processes involving the same vapor phase reaction. More particularly, in accordance with applicant's process there is created an upward flow of vaporous iron chloride and an oxygen-containing gas through a vertical reaction area provided with a series of at least two communicating reaction zones each separated from the next adjacent one by a foraminous member, while upward with the flow of gases through the reaction area there is maintained a flow of inert solid particles in an amount at least equal to the gas flow rate on a weight basis.

The upward flow of gaseous reactants and inert solid particles in the above-described process remarkably serves to overcome a number of problems associated with prior endeavors to develop a process for oxidizing an iron chloride, particularly those involving some form of fluidized bed technology. On the one hand, the separation of the reaction area into a series of communicating reaction zones makes it possible to increase the length of the reaction zone beyond what could otherwise be used. Thus channeling of the gas is no longer a problem with the result that high conversions are readily possible in a commercial size operation. The cycling of inert solid particles through the reaction area also makes it possible to eliminate any tendency for iron oxide scale to accumulate either on the reactor walls or on the foraminous members separating the reaction zones from one another. Further advantages of the process will be apparent from the detailed description and examples which follow.

DESCRIPTION OF DRAWING AND OPERATION

The drawing shows, in schematic fashion and not to scale, apparatus elements that may be used for effecting the oxidation of iron chloride in accordance with the invention. The elements together form a loop for conducting the process on a continuous cyclic basis.

The iron chloride, in this case ferric chloride, is gravity fed in powder form from a suitable storage bin through a hopper into calibrated screw feeder 10 which serves to inject it into a stream of oxygen, under pressure, from supply vessel 12. The iron chloride may be relatively pure, or may be a product containing substantial impurities as well. In any event the oxygen and particulate ferric chloride, both of which are conveniently at ambient temperature, are combined in suitable proportions by appropriate regulation of valve 13 and variable power source 11. The oxygen/ferric chloride blend is then pneumatically conveyed under the pressure of the oxygen through line 14 directly into the base of oxidation reactor 15. It will be understood that the relative proportions of oxygen and ferric chloride are such as to ensure that sufficient oxygen will be available to react with all of the ferric chloride. Thus the amount of oxygen employed will be at least 100%, and preferably at least 105%, of that which is theoretically required to react with the ferric chloride. While it is entirely possible to use air, oxygen-enriched air, or oxygen/inert gas mixtures for effecting the oxidation, the use of relatively pure oxygen is most advantageous in order to achieve a high conversion.

Oxidation reactor 15 is generally cylindrical in shape, being composed of a series of three superposed reaction zones 16, 17 and 18. The exterior reactor wall is composed of a heat resistant material, for example a foundry type of brick or a metal such as Inconel. It will be noted that the wall defining lower reaction zones 17 and 18 tapers to some extent at the base in order to ensure uniform flow of solids and gas throughout the reactor. With large reactors, it is advantageous for the diameter to be somewhat smaller in the lower portion, i.e. that defining zone 16, where solid ferric chloride enters. Successive zones, i.e. zones 17 and 18, may have a somewhat greater diameter to allow for the increased volume of gas as the ferric chloride vaporizes.

The oxygen and ferric chloride blend enters lower zone 16 through a single port 21. Just above port 21, conduit 20 intersects the wall reactor 15, i.e. at port 19, to thereby enable the introduction of inert solid particles into zone 16 at the same time that oxygen and ferric chloride are entering.

Between zones 16 and 17, and between zones 17 and 18, are foraminous disc-shaped members 22 and 24, which are in the nature of so-called distributor plates or baffles, as commonly used in connection with fluidized beds. These may be composed of metallic or ceramic materials, e.g Inconel or sintered alumina. The purpose of the discs 22 and 24 is to subdivide the vertical reaction area defined by reactor 15 into a series of successive communicating reaction zones such that the distribution of particles will be essentially homogenous throughout the reactor, and indeed will be in the nature of a fluidized mass suspension of particles. It will be understood, however, that while the gas composition will be highly uniform in each zone it will vary from one zone to the next, i.e. the quantity of oxygen and vaporous ferric chloride progressively decreases from one zone to the next.

Product is withdrawn from the uppermost zone 18 through a single port 26. The product is a gas/solids mixture composed largely of chlorine gas and inert solids having ferric oxide entrained thereon. It further contains some fine particle size ferric oxide and, possibly, some unreacted oxygen and vaporous ferric chloride. In any case it is transported by means of conduit 27, again pneumatically, to a cyclone 28, or other suitable device for effecting a separation of the gaseous and solid components. The gaseous components in the product exit from the cyclone through line 31 to appropriate chlorine storage facilities or directly to some means involving its use, e.g. to a chlorination reactor. If desired, it can be first subjected to conventional filters, scrubbers, or other purification devices to remove any unwanted components, for example to remove ferric chloride or fine particle size ferric oxide as desired.

The solid fraction removed from the gas/solids mixture by cyclone 28 is recycled to reactor 15 after passing successively through conduits 33 and 20. Needle valve 34, at the juncture of conduits 33 and 20, is manually operated to regulate the flow of inert solids through the entire loop.

The operation of the apparatus will now be described in further detail. While this will be given with particular reference to ferric chloride, it will be understood that ferrous chloride can likewise undergo oxidation in a generally similar fashion.

Since the reaction between ferric chloride, or even ferrous chloride, and oxygen is exothermic, it is generally unnecessary, at least in a commercial size operation, to supply heat directly to the system once a steady state is achieved. Normally there is a need at start-up, however, to preheat the entire oxidation loop, i.e. to 400° C. or more, in order to ensure that the oxidation reaction will continue once it is commenced. This may readily be achieved by cycling inert solids and an inert gas, such as nitrogen throughout the loop while externally furnishing heat, e.g. by means of an electric resistance heater about the reactor and associated elements forming the loop. In any case it is advantageous, for maximum efficiency and for maintenance of an adequately high reaction temperature, to provide full insulation about those elements as well.

Once the steady state is achieved, the blend of ferric chloride and oxygen, or other oxygen-containing gas, is introduced under pressure with the oxygen preferably being used in excess. Essentially all of the ferric chloride vaporizes in lower zone 16 while simultaneously being mixed with the recycling inert solid particles. The velocity of the gas, notably the oxygen-containing gas, serves to maintain the solid particles in the form of a fluidized mass suspension throughout the confines of the reactor.

The amount of inert solids passing into, upwardly through, and out of the reactor 15 must be kept at a high level during the process. This is accomplished, first, by ensuring that control valve 34 is sufficiently open to permit flow of the solids to the reactor and, secondly, by providing an adequate supply of fluidizing gas at the base of the reactor, e.g. under a pressure of at least 1 p.s.i.g. and preferably under a pressure of at least 3 p.s.i.g. at the inlet.

As the gas/solids mixture is conveyed into and through the reactor, the ferric chloride is rapidly vaporized and converted to ferric oxide. The partial pressure of ferric chloride will thus progressively decrease from one zone to the next. This is a significant advantage, for example, in comparison with the fluid bed operation of abovementioned U.S. Pat. 2,642,339, which inherently involves having nearly the same partial pressure for ferric chloride at both inlet and outlet ports.

The flow of inert solids upwardly through the reactor zones and the connecting foraminous member or members accomplishes several functions. Thus on the one hand the particles help to speed the iron oxide product through and out of the oxidation reactor for separation or recovery. Additionally, the rapid, indeed turbulent, flow of particles effectively prevents the build-up of iron oxide scale on the reactor walls or on the foraminous members. The recycled solids also offer a convenient means for supplying sensible heat to the reactor to rapidly vaporize the ferric chloride without undue sticking by keeping the liquid ferric chloride content at a minimum. Then, too, with this mechanism it is not necessary to have to pelletize or otherwise specially prepare the ferric chloride.

In any event, it has been determined that on a weight basis, the flow of inert solids through the oxidation reactor must be at least equal to the flow of gas through the reactor. This condition is necessary to ensure that the inert solids will be homogeneously dispersed and conveyed in the gas stream throughout the height of the reactor and that the velocity component of the particles will be adequate to prevent iron oxide scale from accumulating on the apparatus. Most advantageously, the flow of inert solid particles will be about 5 to about 20 times the flow of gas, again on a weight basis. Thus, it will be understood that if gas is flowing through exit port 26 at a rate of ten pounds per hour, the flow of inert solids should be at least ten and preferably 50 to 200 pounds per hour.

On a velocity basis, the process of the invention will normally operate with a superficial velocity, for the gas passing through the reactor, of between 0.2 and 2 ft./sec., preferably between 1.0 and 1.5 ft./sec. The superficial velocity through the restricted openings defining the foraminous members will be considerably greater, however, usually being 10 to 100 ft./sec. and more preferably 20 to 50 ft./sec. The superficial velocity refers, of course, to the gas velocity in the absence of solids, i.e. as flowing through an empty reactor.

It will be noted that the deliberate cycling of inert solids through the oxidation reactor, indeed at a rate which approximates that of the gas, distinguishes the process of the invention from fluidized bed operations such as that of aforementioned U.S. Pat. 2,642,339, in which solids blowover is kept to a minimum or may be eliminated altogether. In other words there is, with the process of the invention, no distinct bed level as the reactor is considered to be filled or flooded. The process can furthermore be distinguished from the usual type of dilute phase operation as these generally involve much more dilute systems and much higher superficial gas velocities, i.e. 15 to 30 ft./sec. rather than 0.2 to 2 ft./sec. as employed herein.

The pilot plant size oxidation reactor described in Example I hereinafter resembles that of the drawing in that three communicating reaction zones are employed. For a larger scale operation, however, two reaction zones will generally be preferred. It is to be understood that the use of two, three, or even more zones is contemplated as being within the scope of the invention. In any event, the zones should be in superposed communicating relationship, i.e. to avoid piping between the zones. They need not, of course, be of the same cross-sectional or length dimensions.

The size and number of the sieve holes in the foraminous members which connect the reaction zones can be selected with reference to such variables as the reactor geometry and dimensions, the desired production rates, and the size of the inert solids to be employed. Instead of employing a plate with holes it is also practical to use a grid or screen. There should be a plurality of holes in the member and, for best results, they should be distributed somewhat uniformly across the plates. In general the holes should be designed to enable uniform distribution of the gas and solids in the zone thereabove without danger that plugging will occur. This is typically accomplished if the pressure drop between successive zones is kept in the range of about 0.5 to 10 p.s.i.g., and preferably in the range of about 1 to 5 p.s.i.g. Various design concepts relative to the use of foraminous members for fluidized beds are known in the literature, e.g. A.I.Ch.E. Jour., pp. 54–60, vol. 5, No. 1, March 1959.

The nature of the inert particulate solids is not a critical feature of the invention. It is to be understood, however, that while the term "inert" is meant to exclude materials that will chemically react in the oxidation reactor or otherwise interfere with the iron chloride conversion, it is not to be construed as excluding materials that may exert some catalytic effect. Particles of sand, silica, alumina, titania (rutile), iron oxide, or like temperature resisting materials may conveniently be employed. Eventually the particles, regardless of their initial composition tend to become coated with iron oxide, and indeed the repeated attrition and build-up may tend to convert the particles almost completely to iron oxide. In general there is no need to separate oversize particles from the recycling stream for the gradual removal of fines along with the gaseous products, e.g. from the cyclone via line 31, is adequate to maintain a farily constant proportion of solids in the loop. For most purposes, the inert solid particles should have a particle size of 0.04 to 0.2 mm., preferably of 0.07 to 0.15 mm.

The process of the invention is conducted to maintain a temperature in the range of 400° C. to 1000° C. As is known, the conversion of ferric chloride to ferric oxide is temperature dependent, with higher conversions being possible in the lower part of the range. Thus at a temperature of about 500° C. nearly 100% conversion is possible. But as the temperature increases toward 1000° C., the maximum possible conversion is on the order of 60%. Some 90% conversion is possible, however, at a temperature of 700° C. It will be understood that somewhat higher rates of conversion are attainable with temperatures in the higher portion of the range. At any rate and as a compromise between conversion and conversion rate, the preferred operating temperature is 500 to 750° C. If necessary, it is entirely practical to introduce along with the ferric chloride a small amount of coke for burning in order to keep the temperature at a suitably high level.

There is no serious objection apart from the problem of obtaining suitable equipment, to charging oxygen and iron chloride to the reactor under relatively high pressure. For example, pressures on the order of even 40 p.s.i.g. or more in the reactor itself may slightly lower the reaction rate but otherwise are not detrimental. Indeed it is a real advantage to the process that by operating with higher pressures it is possible to obtain a chlorine product which would be recovered under pressure, i.e. liquified, and which would be capable of use as such, without the need for further compression. This is of particular benefit where the oxidation process is to be operated in conjunction with a process for the chlorination of a titanium dioxide bearing material to produce titanium tetrachloride and, eventually, titanium dioxide pigment.

EXAMPLE 1

The ferric chloride employed is technical grade ferric chloride in solid form. The oxygen is pure oxygen and the inert solid particles are 0.1 to 0.2 mm. size mineral rutile.

The apparatus employed is of pilot plant size and essentially the same as that described in connection with the drawing. The ferric chloride is gravity fed into the oxygen line and the mixture pneumatically conveyed through line 14 directly into the base of oxidation reactor 15.

The oxidation reactor 15 has three zones, as shown, and the internal diameter of upper zones 17 and 18 is 3 inches while that of lower zone 16 is 2 inches. The height of each zone is 4 inches, thus providing a total reactor height of 12 inches. Zones 16 and 17 are cone-shaped at the base. Inlet ports 19 and 21, outlet port 26, and conduits 27, 33 and 20 are all ½ inch in diameter. Foraminous discs 22 and 24 are ¼ inch thick and are composed of sintered alumina, each having three centrally located holes therethrough. The holes are 0.325 inch in diameter.

Reactor 15 communicates via conduit 27 with cyclone 28. The latter serves to separate the resultant gas/solids mixture into a gas fraction, which is taken off through conduit 31, and a solids fraction which exits through conduit 33. Particles of ferric oxide the mesh of which is in excess of about 200 mesh are blown out of the cyclone through conduit 31 along with the gas. The chlorine in the gas fraction is analyzed by means of a Du Pont UV Analyzer Model F3. The quantity of chlorine so analyzed is related to the ferric chloride feed to ascertain the percent conversion.

Control valve 34 serves as a hold-up point to conduit 20, i.e. thus forming a seal leg. It can be manually adjusted to vary the flow of inert solid particles through reactor 15.

In commencing the oxidation reaction, reactor 15 and cyclone 28, as well as conduits 27, 33 and 20 are first heated to a temperature of 550° C. before oxygen and ferric chloride are introduced. This is accomplished by means, not shown, in which an electric resistance wire is wrapped around the entire loop and connected to a suitable power supply. For purposes of the start-up, rutile particles as the inert solids are circulated along with nitrogen gas under pressure, which may be introduced at any convenient point in the loop, to propel the inert solids.

When a steady cyclic flow is achieved at a temperature of 550° C., valve 13 is opened and oxygen is introduced at a rate of 30 standard cubic feet per hour. Likewise screw feeder 10 is operated to introduce ferric chloride at a rate of 2 lbs. per hour into the oxygen stream. The ferric chloride/ oxygen stream in line 14 is at a temperature of about 20° C. and under a pressure of about 5 p.s.i.g. Control valve 34 is adjusted as necessary so that the flow of inert solids therethrough and into reactor 15 is maintained at a rate of approximately 60 lbs. per hour. The net effect is that ferric chloride is constantly vaporized in zone 16 while oxidation occurs in all three zones. The weight ratio of solids to gas flowing through the reactor is about 10:1. The superficial gas velocity is about 1 ft./sec. through reactor 15.

The temperature in lower reactor zone 16 is maintained at a relatively constant 550° C.; the temperature in upper reactor zone 18 is about 650° C.

Over a sustained operating period of several hours, a ferric chloride conversion rate of 12% is achieved. Although this means that some 88% of the ferric chloride passes unreacted through the reactor, this amount is judged to not be excessive considering the small size of the pilot plant reactor. Thus by calculation from the kinetic expression for the oxidation of ferric chloride, it is concluded that for a commercial size reactor which is some 8 to 12 feet in length, as opposed to the much smaller reactor actually employed, a conversion rate of about 90% or more should be readily attainable. While also during the operation it is necessary to supply heat by means of the electric resistance heater to maintain the 550° C. temperature, it is calculated that this would be unnecessary with a commercial size reactor which has been properly insulated.

During the operation it is noted that the size of the inert solids being recycled stays relatively constant in the 0.1 to 0.2 mm. range. Apparently the rutile undergoes some degree of size reduction along with a coating build-up, however, as the ratio of ferric oxide to rutile in the solids gradually increases.

After the operation is discontinued, reactor 15 is disassembled and examined. Neither the reactor wall nor discs 22 and 24 show evidence of appreciable build-up of solids.

EXAMPLE 2

The procedure of Example 1 is repeated while maintaining a reaction temperature of 700° C. The higher temperature results in an increased conversion, such that 50% of the ferric chloride is oxidized. Other conditions are as before.

As in the case with Example 1, a much higher conversion would be attained with a commercial size reactor. On a relative basis, however, the maximum conversion would be somewhat less than in Example 1 owing to the less favorable equilibrium encountered at 700° C.

EXAMPLE 3

This example describes a general form of operation for effecting the oxidation on a commercial scale.

The oxidation reactor is similar to that described in connection with the drawing and Example 1, but has only two communicating reaction zones. These are each 6 ft. in height, the upper one being 9 ft. in diameter and the lower one being 6 ft. in diameter. Inlet and outlet ports are 2 ft. in diameter, as are connecting conduits to and from the cyclone. Oxygen enters the lower zone through a distributor plate provided with a series of 148 bubble caps to ensure homogeneity. There is a second arch-shaped distributor plate separating the two reaction zones, it being provided with a series of 148 holes that are 1 inch in diameter and varying from 12 inches in length near the center of the plate to 18 inches near the edge. Ferric chloride is fed in particulate form from a screw conveyor directly into the base of the lower zone through the reactor wall; that is, it is fed separately from the fluidizing gas in order to avoid plugging the bubble caps.

With such an arrangement operated in the preferred temperature range of 500° C. to 750° C., and with a superficial gas velocity of .5 to 1.5 ft./sec., 90% conversion is considered to be attainable using about a 10% stoichiometric excess of oxygen. About 60 to 70% of the conversion takes place in the lower reaction zone.

What is claimed is:

1. In a process for the production of chlorine and iron oxide by reacting oxygen with iron chloride in the vapor phase at a temperature of 400° C. to 1000° C. by upward flow of an oxygen-containing gas and vaporous iron chloride through a vertical reaction area, the improvement wherein the reaction area is provided with a series of at least two communicating reaction zones each separated from the next adjacent one by a foraminous member having a plurality of holes for flow of gaseous and particulate material therethrough thereby to produce a pressure drop between said communicating zones in the range of about 0.5 to 10 p.s.i.g. and there is maintained upward with the flow of gases a flow of inert solid particles which pass into and out of the reaction area in an amount at least equal to the gas flow on a weight basis, the inert solid particles forming a flooded dense-fluidized mass throughout the confines of the reaction area and the iron oxide becoming coated thereon.

2. Process according to claim 1 wherein the flow of inert solid particles is about five to about twenty times said gas flow on a weight basis.

3. Process according to claim 1 wherein the iron chloride is ferric chloride.

4. Process according to claim 3 wherein the temperature is 500° C. to 750° C.

5. Process according to claim 1 wherein the oxygen-containing gas is employed in an amount which is in excess of that stoichiometrically required to react with the iron chloride.

6. In a process for the production of chlorine and iron oxide by reacting oxygen with iron chloride in the vapor phase at a temperature of 400° C. to 1000° C. by upward flow of an oxygen-containing gas and vaporous iron chloride through a vertical reaction area, the improvement wherein the reaction area is provided with a series of at least two communicating reaction zones each separated from the next adjacent one by a foraminous member having a plurality of holes for flow of gaseous and particulate material therethrough, there is maintained upward with the flow of gases a flow of inert solid particles, having a particle size of 0.04 to 0.2 mm., which passes into and out of the reaction area in an amount at least equal to the gas flow on a weight basis, the superficial velocity for gas passing through the reaction area being between 0.2 and 2 ft./sec., the inert solid particles forming a flooded dense-fluidized mass throughout the confines of the reaction area and the iron oixde becoming coated thereon.

7. Process according to claim 6 wherein the iron chloride is ferric chloride and the gas passes through the holes of the foraminous member at a superficial velocity of 10 to 100 ft./sec.

8. Process according to claim 6 wherein the temperature is 500° C. to 750° C.

9. Process according to claim 1 wherein the iron chloride is ferric chloride and it enters the reaction area in partciulate form for vaporization in said reaciton area.

10. Process according to claim 9 wherein the inert solid particles are cycled from and to the reaction area and serve to supply sensible heat to the reaction area to rapidly vaporize the said particulate ferric chloride.

References Cited

UNITED STATES PATENTS

| | | | |
|---|---|---|---|
| 3,361,525 | 1/1968 | De Rycke et al. | 423—633 X |
| 3,306,760 | 2/1967 | Zirngibl et al. | 423—632 X |
| 3,404,964 | 10/1968 | Harris et al. | 423—633 |
| 3,482,946 | 12/1969 | Shirk | 23—288 S |
| 3,705,017 | 12/1972 | Jones | 23—288 S |

OTHER REFERENCES

Reh.; Chemical Engineering Progress," vol. 67, No. 2, February 1971, pp. 58–63.

GEORGE O. PETERS, Primary Examiner

U.S. Cl. X.R.

423—138, 502